United States Patent [19]
Patterson

[11] 3,806,180
[45] Apr. 23, 1974

[54] DEFORMABLE ENERGY ABSORBING BUMPER

[76] Inventor: Robert Patterson, P.O. 910, Sport Hill Rd., Easton, Conn. 06612

[22] Filed: Feb. 14, 1972

[21] Appl. No.: 225,783

[52] U.S. Cl.............. 293/1, 188/1 C, 293/70, 293/89
[51] Int. Cl..... B60r 19/04, B60r 21/02, B61f 19/04
[58] Field of Search............... 293/1, 64, 65, 66, 67, 293/85, 86, 60, 70, 89; 188/1 C

[56] References Cited
UNITED STATES PATENTS

| | | |
|---|---|---|
| 2,573,510 | 10/1951 | Terranova............................. 293/85 |
| 3,130,998 | 4/1964 | Andersen............................ 293/65 X |
| 1,686,991 | 10/1928 | Schauman et al. ................ 293/85 X |
| 1,861,691 | 6/1932 | Gabel................................... 293/85 |
| 3,666,310 | 5/1972 | Burgess et al...................... 293/85 X |
| 3,705,740 | 12/1972 | Shiomi................................. 293/89 |

Primary Examiner—Lloyd L. King
Assistant Examiner—Howard Beltran
Attorney, Agent, or Firm—Charles E. Temko

[57] ABSTRACT

An energy absorbing bumper construction incorporating easily replaceable, progressively deformable structure in the form of transversely extending pipe-like members arranged for progressive deformation between inner and outer bumper and bumper support members.

4 Claims, 5 Drawing Figures

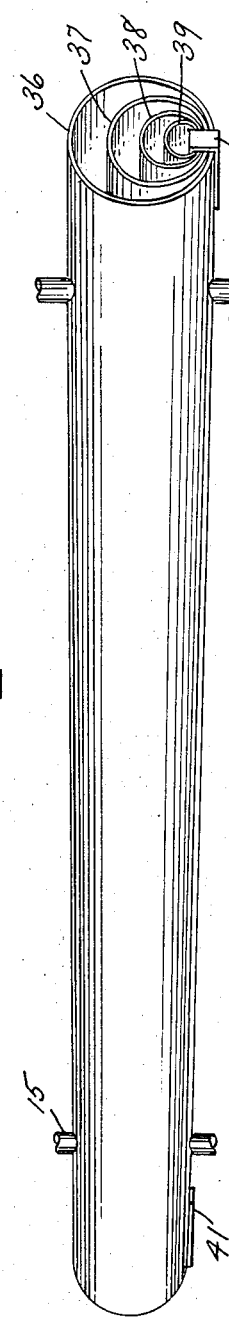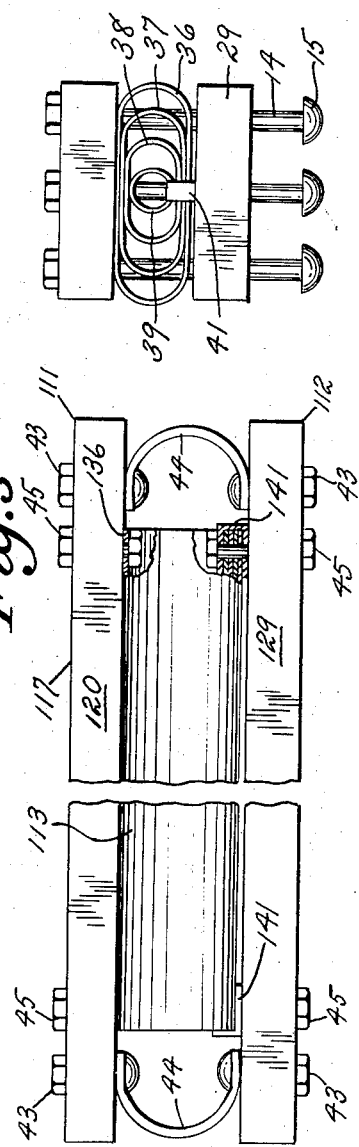

DEFORMABLE ENERGY ABSORBING BUMPER

This invention relates generally to the field of automotive bumper structure, and more particularly to bumper structure of a type adapted to absorb and dissipate the kinetic energy involved in a substantial impact.

BACKGROUND OF THE INVENTION

Automobile bumper design, over the past several years has become increasingly important owing to the high cost of repairing damage incurred during collision, principally because of the large amount of hand labor necessitated by the straightening of body panels and structural frame members. While shock absorbing bumpers are known in the art, most constructions have included relatively expensive components, such as hydraulic dampers, springs and the like. Other constructions have included the provision of pipes, the principal axis of which is parallel to the line of motion of the automobile, and which absorb energy by being expanded over a shaping member during collision. The principal problem with such devices lies in the difficulty in providing adequate shock absorbing capability over the entire transverse length of the bumper, rather than at selected points between which impact often occurs. The other disadvantage which has prevented widespread use of such devices is the high cost of manufacture which would significantly add to the total cost of production of the car.

BRIEF SUMMARY OF THE INVENTION

In accordance with the present invention, the contemplated shock absorbing structure includes an outer bumper member extending transversely across the front of the automobile which is supported by a rearwardly positioned bumper support member of equal dimensions, the latter member being supported from the frame of the automobile. Between the bumper and the bumper support members a plurality of soft metal pipes are supported in such manner that they progressively deform under impact. The pipes are maintained in position by detachable means such as nuts and bolts, permitting the easy replacement of members which have become deformed at relatively low cost. This construction permits a large amount of deformable materal to be incorporated into the bumper structure, and permits like energy absorptive capacity at all points along the bumper.

BRIEF DESCRIPTION OF THE DRAWINGS

In the drawings, to which reference will be made in the specification, similar reference characters have been employed to designate corresponding parts throughout the several views.

FIG. 1 is a fragmentary schematic top elevational view of an embodiment of the invention.

FIG. 2 is a schematic end view thereof.

FIG. 3 is a schematic view in perspective showing the individual pipes or cylinders forming the energy absorbing element of the device.

FIG. 4 is a schematic end elevational view, corresponding to that seen in FIG. 2, but showing the energy absorbing structure in deformed condition.

FIG. 5 is a fragmentary view corresponding to FIG. 1, and showing an alternate form.

DETAILED DESCRIPTION OF THE DISCLOSED EMBODIMENT

In accordance with the invention, the device, generally indicated by reference character 10, comprises broadly: an outer bumper member 11, an inner bumper support member 12, an energy absorbing element 13, a first plurality of bolts 14 interconnecting members 11 and 12, and a second plurality of bolts 15 interconnecting the element 13 with members 11 and 12.

The outer bumper member 11 may be most suitably formed of strap iron, and is bounded by an outer surface 17, an inner surface 18, end surfaces, one of which is indicated by reference character 19, and longitudinal edge surfaces 20. An optional decorative shell 21 may be carried by the member 11 to provide a more attractive appearance, and is preferably of U-shaped cross section, including a base wall 22, and cover walls 23 and 24.

The inner bumper support member 12 is of similar construction and configuration, and is bounded by an outer surface 26, an inner surface 27, end surfaces 28, and longitudinal edge surfaces 29. It is interconnected to supporting structure 30 by nut and bolt means 31–32, the precise points of interconnection depending upon the construction of the particular automobile involved.

The energy absorbing element 13, as has been mentioned, consists of a plurality of elongated soft metal pipes of varying diameters positioned one within another in such manner as to permit progressive deformation of the same transversely of the principal axis of each, depending upon the amount of energy to be absorbed. These may be formed using sections of pipe cut to uniform length, and considering the largest of the tubes 36 to be of three inch diameter, the intermediate tubes 37 and 38 may be of two inch and one inch diameter, with the smallest tube 39 to be of one half or three quarter inch diameter. It will be understood, of course, that the above dimensions are to be considered as exemplary, and where very large vehicles are involved, more tubes may be provided of still larger diameter.

As best seen in FIG. 3, the tubes are not arranged in concentric fashion, but rather they are held in mutual contact along one line of each by a clip 41 which may be substituted by spot welding. The line 42 overlies the outer surface 26 of the member 12, so that when an impact is received by the outer bumper member 11, the largest tube member 36 will first deform until it meets the next largest tube 37, following which both tubes will simultaneously deform until the third tube 38 is reached. As illustrated in FIG. 4, a fairly substantial impact will cause deformation of three tubes, leaving the fourth tube undistorted. Where the impact received by the member 11 is distributed along a substantial segment of the same, the element 13 is obviously able to abosrb a greater amount of energy than when, for example, the vehicle hits a vertically extending pole or similar object. In the latter case, however, the greater the deforming action progresses, the greater the length of each individual tube 36–39 will be brought into deformed condition.

The bolts 14, as has been mentioned, interconnect the members 11 and 12 independently of the element 13, and are located in areas free of interference with the element 13. Upon compression of the member 11 with respect to member 12, they will become slidingly displaced to the condition shown in FIG. 4 in the drawing, but will otherwise not suffer substantial damage. The bolts 15 project through holes in each of the members 37–39 forming the element 13 as well as the members 11 and 12, so as to be maintained therebetween. During the deforming of the element 14, some of the bolts 15 may become deformed, and if necessary, they may be discarded along with the deformed element 13 when the latter is replaced.

Turning now to the alternate form of the embodiment illustrated in FIG. 5, parts corresponding to those of the principal embodiment have been designated by similar reference characters with the additional prefix "1."

In the embodiment of FIG. 5, the first plurality of bolts 14 is replaced by short bolts 43 interconnecting a curved section of strap iron 44. The second plurality of bolts 15 is replaced by short bolts 45, which bolt the tube 36 directly to the outer bumper member 111, and the tubes 37, 38 and 39 to the inner bumper support member 112. This construction prevents the possibility of the elongated bolts of the principal form from being distorted as the device collapses, making removal of the same difficult when parts are replaced. If desired, the strap iron 44 may be replaced by a piece of tubing which has been cut longitudinally and transversely to form U-shaped segments.

I wish it to be understood that I do not consider the invention limited to the precise details of structure shown and set forth in this specification, for obvious modifications will occur to those skilled in the art to which the invention pertains.

I claim:

1. Automobile bumper construction comprising: an outer longitudinally-extending bumper member, an inner generally parallel bumper supporting member, and a permanently deformable energy absorbing element including a plurality of longitudinally extending tubes of varying effective diameter and positioned one within another, each of said tubes having a principal mutually parallel longitudinally extending axis, and positioned between said bumper and bumper support members to be sequentially deformable; and telescoping means interconnecting said bumper member and bumper support member to press the same into contact with a surface of the largest diameter tube; whereby upon the occurrence of substantial impact upon said bumper member, said tubes will permanently deform to absorb the impact energy transmitted.

2. Structure in accordance with claim 1, said telescoping means penetrating each of said tubes.

3. Structure in accordance with claim 1, including positioning means penetrating said bumper and bumper support member spaced from said tubes.

4. Structure in accordance with claim 1, wherein said tubes are arranged in offset mutual relation to allow for progressive deformation commencing with the largest diameter tube upon impact imparted to said bumper member.

* * * * *